(12) United States Patent
Jean et al.

(10) Patent No.: US 8,077,549 B2
(45) Date of Patent: Dec. 13, 2011

(54) FRONTAL SONAR

(75) Inventors: Frédéric Jean, Meounes les Montrieux (FR); Frédéric Mosca, Marseilles (FR)

(73) Assignee: IXBLUE, Marly-le-Roi (FR)

( * ) Notice: Subject to any disclaimer, the term of this patent is extended or adjusted under 35 U.S.C. 154(b) by 356 days.

(21) Appl. No.: 12/301,092

(22) PCT Filed: May 15, 2007

(86) PCT No.: PCT/FR2007/051273
§ 371 (c)(1),
(2), (4) Date: Apr. 22, 2009

(87) PCT Pub. No.: WO2007/132125
PCT Pub. Date: Nov. 22, 2007

(65) Prior Publication Data
US 2009/0231957 A1    Sep. 17, 2009

(30) Foreign Application Priority Data
May 16, 2006  (FR) ...................................... 06 51763

(51) Int. Cl.
*G01S 15/89* (2006.01)
(52) U.S. Cl. ........................................................ 367/88
(58) Field of Classification Search .................... 367/88, 367/103
See application file for complete search history.

(56) References Cited

U.S. PATENT DOCUMENTS

| 4,970,700 | A | 11/1990 | Gilmour et al. |
| 5,177,710 | A | 1/1993 | Gilmour et al. |
| 5,412,618 | A * | 5/1995 | Gilmour ......................... 367/88 |
| 5,596,549 | A | 1/1997 | Sheriff |
| 5,598,163 | A | 1/1997 | Cornic et al. |
| 2005/0099887 | A1 | 5/2005 | Zimmerman et al. |
| 2009/0231957 | A1 * | 9/2009 | Jean et al. ..................... 367/103 |

FOREIGN PATENT DOCUMENTS

| EP | 0 568 427 | 11/1993 |
| FR | 2 688 894 | 9/1993 |
| WO | WO 2007132125 A2 * | 11/2007 |

OTHER PUBLICATIONS

International Search Report dated Nov. 7, 2007, from corresponding PCT application.

* cited by examiner

*Primary Examiner* — Daniel Pihulic
(74) *Attorney, Agent, or Firm* — Young & Thompson

(57) ABSTRACT

Frontal sonar for observing the seafloor, characterized in that it includes: elements for insonifying a seafloor area divided into M sectors, able to perform a characteristic insonification of each sector of the area during an operation recurrence of the sonar; and receiving elements including a physical antenna consisting of an array of K transducers, the antenna being lacunar and thus ambiguous, so that it defines N image lobes, and in that each of the characteristically insonified sector is associated with a single image lobe defined by the antenna, so that the antenna ambiguity is removed.

17 Claims, 5 Drawing Sheets

FRONTAL SONAR

The invention belongs to the field of sonar-type acoustic devices that enable grazing-incidence observation of the seafloor. More particularly, the invention relates to sonars mounted on carriers which can be surface ships or submerged "fishes", self-propelled or towed by a surface boat, moving along a so-called longitudinal direction X. Still more particularly, the invention belongs to the field of sonars that enable observation of a seafloor strip located directly below the carrier along the longitudinal direction. The sonar can be the only imaging system on board of the carrier where it can be coupled with other sonars and in particular lateral sonars. In the latter case, the strip to be observed is located between two lateral areas observed by means of lateral sonars arranged on each of the carrier's flanks.

Lateral sonars does not allow to observe the seafloor under a sight angle lower than 30° relative to the vertical running through the carrier and following a plane perpendicular to longitudinal direction X. Consequently, the seafloor strip located under the carrier's belly cannot be observed during the carrier passage.

To obtain data about this intermediate strip by means of carriers having only lateral sonars, other passages have to be done along navigation trajectories parallel to a first trajectory, so that the strip not observed during the first passage is now "visible" by means of the lateral sonars.

Of course, resorting to other passages to obtain a seafloor image without "holes" requires additional time. And this time has a cost because it corresponds to the operation of the acquisition device, equipment and crew as a whole.

Moreover, a greater accuracy of the final seafloor map comes from the correlation made between different images of the same site. Now, possessing no redundant images, or possessing some but in a fewer number, reduces the interest of subsequent data processing for image correlation. Therefore, the final image, for example a shadows-and-echoes image, has a lower resolution.

Consequently, there is a need for a carrier-borne sonar device enabling sonar data acquisition relating to the strip located under the carrier, strip which is not observed by other sonar means.

Of course, there exist carriers provided with multibeam sounders which are acoustic devices of another type because they enable normal-incidence observation of the seafloor. But the informations collected by theses devices do not correspond to sonar-obtained informations. If sonars mainly enable shadows-and-echoes images to be obtained, sounders mainly enable to obtain topographic or bathymetric images.

Further, it has been proposed to arrange in front of the carrier sonars that take up the technology used by lateral sonars. Such frontal sonars are thus provided with a composite physical antenna consisting of a row of transducers in alignment with the antenna length. The antenna is so arranged on the carrier to be horizontally oriented, with the length thereof coinciding with lateral direction Y of the carrier. Hence, the frontal sonar antenna is arranged perpendicular to the lateral sonar antennas.

Now, it is known that resolution of such a sonar is given by the ratio of working wavelength to physical antenna length. The carrier must be hydrodynamic, so it is easy to arrange antennas with great linear dimensions on the carrier's flanks, but the available space in the width direction of the carrier prevents great-length antennas to be arranged in front of the carrier. Consequently, physical antennas of frontal sonars according to the prior art are small-sized. If physical antennas of lateral sonars can be generally of the order of 2 m long, frontal sonar antennas are rather of the order of 50 cm long.

Having only short antennas for frontal sonars leads to resolution degradation. In particular, the resolution of images obtained with a frontal sonar is much lower than the resolution of those obtained by the lateral sonars of the same carrier.

An order of magnitude is given by a lateral sonar the physical antenna of which has a length of 2 m and an acoustic working frequency of the order of 100 kiloHertz (kHz). Such a sonar enables a resolution of 15 cm at a maximal range of 300 m to be obtained.

It follows that, even if data about the central strip are acquired during the first passage, it will be necessary to repeat parallel passages to map this strip with a resolution close to that of the lateral areas observed by the lateral sonars. Finally, it almost ends up in the case of a carrier having no frontal sonar.

To increase the resolution of a physical antenna having a limited length, if only for reasons of carrier hydrodynamics, it has thus been proposed to increase the sensor number of the antenna. For example, the COSMOS project developed by IFREMER is a frontal sonar. It comprises, for the emission, 125 emitters arranged in an arc of circle and, for the reception, a 70-cm-long antenna consisting of two rows each comprising 32 transducers. Such a frontal sonar operating at 100 kHz enables a resolution of 160 cm at a range of 80 m to be reached.

The drawbacks of such a solution are known. Firstly, each sensor has to be fitted with electronics arranged near the sensor. It follows that the sensor density is limited by the steric space requirement of the associated electronics. The channel number of the antenna is thus limited. Further, the cost of the sonar antenna increases with the number of sensors used. Finally, the data flow to be processed is significant and the acquisition chain has to be particularly efficient.

Therefore, there is a need for a frontal sonar having a resolution identical or anyway close to those of the lateral sonars used, but having a moderate number of transducers.

To that end, an object of the invention is a frontal sonar for observing the seafloor, comprising: means for insonifying a seafloor area divided into M sectors, suitable for performing a characteristic insonification of each sector of the area during an operation recurrence of said sonar; and receiving means comprising a physical antenna consisting of an array of K transducers, the antenna being lacunar and thus ambiguous, so that it defines N image lobes. Each of the characteristically insonified sectors is associated with a single image lobe of the antenna, so that the antenna ambiguity is removed.

Preferably, insonification means comprise as many emission channels as there are sectors to be characteristically insonified.

In the presently contemplated embodiment, the emission channels insonify four sectors respectively, and four useful lobes among the N image lobes of the antenna are associated with the four sectors respectively.

In an embodiment, during a sonar operation recurrence, each of the emission channels emits around an average frequency chosen in a list of average frequencies, each emission channel emitting at a frequency different from that of another emission channel, the average frequency characterising the insonification of a particular sector.

In a variant, during a sonar operation recurrence, each of the emission channels emits around a common average frequency, each of the emission channels insonifying the sector associated therewith at different instants of the recurrence, the emission instant characterising the insonification of a particular sector.

Preferably, the sonar according to the invention allows a resolution lower than 50 cm for a range of 80 m. Still preferably, it allows a resolution of 40 cm for a range of 80 m.

In the presently preferred embodiment, the lacunar antenna is 0.7 m long, comprises 48 transducers and operates at a working frequency of 400 kHz.

Another object of the invention is a carrier provided with a frontal sonar according to the invention.

Preferably, said carrier is submerged and further comprises two lateral sonars, the frontal sonar enabling to obtain a sonar image having a resolution compatible with the resolution of images obtained by the lateral sonars.

Still another object of the invention is a method of observing a seafloor strip by means of a sonar. The method is characterized in that, the sonar being provided with a lacunar antenna consisting of an array of K transducers defining N image lobes, it consists in:
- dividing a seafloor area to be imaged into several sectors;
- geometrically associating a single image lobe with each of the sectors;
- characteristically insonifying each of the sectors using the insonification means of said sonar;
- acquiring the echo of the sound waves emitted by means of the lacunar antenna;
- forming the antenna channels while removing the antenna ambiguity, taking into account the association of an image lobe with a sector and the characteristic insonification of the sector;
- obtaining an image of the seafloor area.

Preferably, during the insonification step, each of the sectors is insonified by means of a sound signal having a characteristic average frequency.

In a variant, during the insonification step, each of the sectors is insonified by means of a sound signal emitted at a characteristic instant of the recurrence.

Still preferably, the channel forming step is performed over K recurrences of the insonification and acquisition steps in order to synthesize an antenna.

The principle of the frontal sonar according to the invention consists in using a receiving antenna that is lacunar, and consequently ambiguous, and removing the ambiguity on the image lobe in which the source of echo is actually located by insonifying each seafloor sector angularly corresponding to an image lobe with a characteristic sound signal.

Advantageously, the limitation on the sensor number is circumvented using a lacunar antenna while removing ambiguity of this antenna thanks to a sectorized emission.

In the presently preferred embodiment, during a sonar operation recurrence, the sound emissions intended to "light" each of the sectors are performed simultaneously but at distinct respective frequencies. The image lobe is thus characterized by a particular frequency. In a variant, the sectorized emissions can be performed at the same frequency but at successive instants. The image lobe is then characterized by the instant of emission of the sound signal. In still another variant, orthogonal acoustic signals are used. Each orthogonal signal then characterizes a single image lobe.

In the contemplated application, as the frontal sonar goal is to complete the map provided by the lateral sonars, tendency would rather be to use a working frequency and a grazing close to those of the lateral sonars. But this cannot be respected if it is desired to approach the required resolution performances. Indeed, the resolution being proportional to $\lambda/L$ and the length L of the antenna being necessarily reduced the working wavelength $\lambda$ has to be reduced too, and thus the working frequency f has to be increased. Advantageously, in the antenna according to the invention, the resolution is improved by increasing the working frequency, which can so be raised to 600 kHz, this working frequency having to be compared to the 100 kHz of the lateral sonars. As a result, the frontal sonar range is reduced. Thus, it is necessary to work at a lower incidence.

Advantageously, obtaining two images at different incidences through the frontal sonar and a lateral sonar offers a gain of information. It is also interesting for the registration operation, which is the referencing of an image relative to the other or relative to an absolute reference.

The invention will be better understood and other purposes, details, features and advantages thereof will become more clearly apparent from the description of a particular embodiment of the invention which is given merely by way of illustrative and non-limitative example with reference to the appended drawings. In these drawings:

FIGS. 1A and 1B schematically show the operation of the frontal sonar according to the invention, respectively in side and top view;

FIG. 2 shows the longitudinal and lateral distributions of the resolutions over an insonified area as well as over an area imaged at 600 kHz;

FIG. 3 schematically shows the lacunar antenna used in the frontal sonar according to the invention;

Figure 1A:
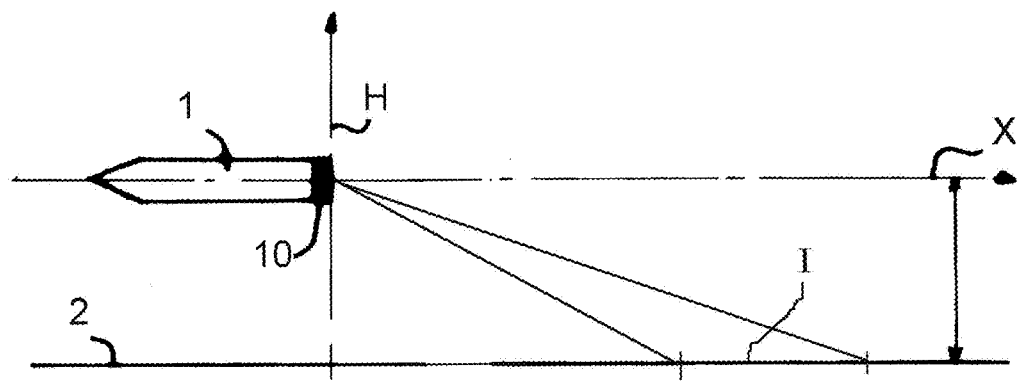
Figure 1B:
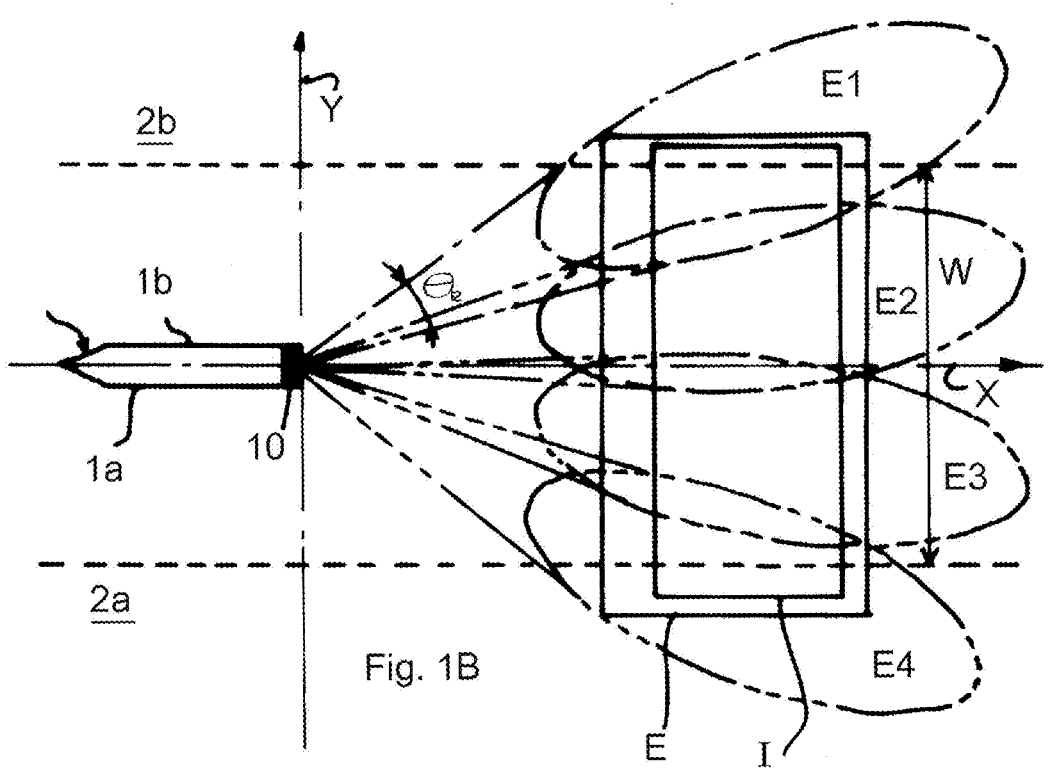

FIG. 1 schematically shows the context in which the frontal sonar according to the invention finds its most preferable use. FIG. 1A is a side view while FIG. 1B is a top view.

A carrier 1, self-propelled or towed, is submerged so as to be positioned at an altitude H of about 30 m relative to seafloor 2. Carrier 1 moves substantially along a navigation trajectory parallel to longitudinal axis X thereof. The direction perpendicular to both direction X and direction H is a lateral direction Y.

Two lateral sonars (not shown) arranged on each of the flanks 1a and 1b of carrier 1 enable a progressive observation of the lateral areas, 2a and 2b respectively, during the displacement of the carrier.

Between these areas observed by the lateral sonars, there is a strip of land of width W that is not observed by the lateral sonars which cannot work at a sight angle lower than 30° relative to the vertical of the carrier in lateral direction Y.

So, the matter is to map a seafloor strip located under the carrier and which, when the latter is at an altitude of 30 m relative to the floor, corresponds to a strip having a width W of about 45 m.

Carrier 1 according to the invention is provided with a sonar 10 arranged in front of it. The goal of frontal sonar 10 is to emit a sound wave able to "light" an insonified area E of seafloor 2, and to "listen to" an imaged area I included in insonified area E. During displacement of carrier 1, acquisition of a succession of imaged areas enables gradual image reconstruction of the central strip not observed by the lateral sonars.

Constraints on the antenna are the following. The reasonable maximal span of the antenna arranged along lateral direction Y is 0.7 m. Taking into account the steric hindrance of acquisition electronics, the number of channels available for the reception is of the order of 48. The working frequency has to be lower than 600 kHz because, beyond this maximal frequency, the effects of signal absorption by the body of water become too large.

Most of the lateral resolution dY depends on the receiving antenna. Actually: $dY=\lambda \times R/L=\lambda \times R/(Ni \times d)$, where Ni is the number of sensors and d is the inter-sensor pitch. Given these two parameters, the resolution will be entirely determined by the range and the frequency.

Figure 2:
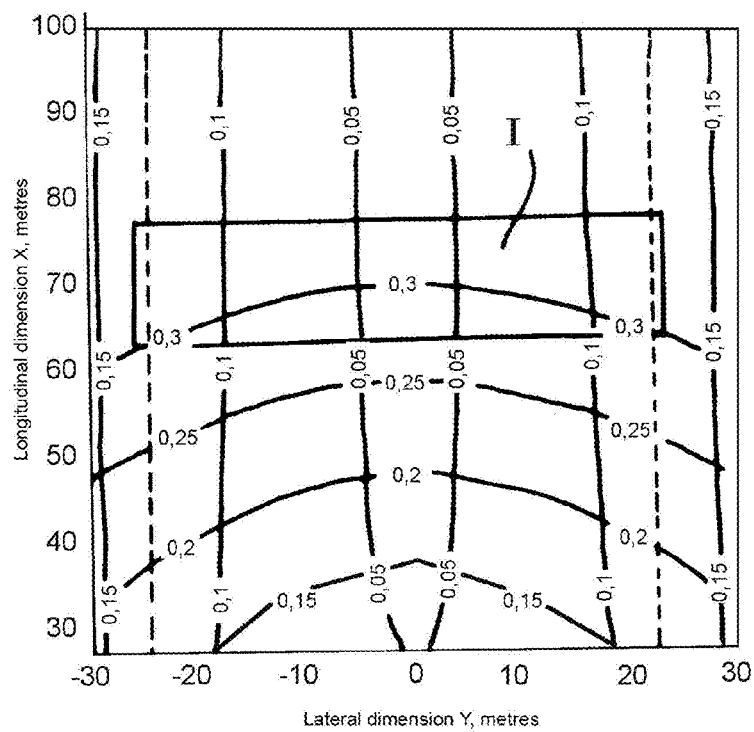

FIG. 2 shows a numerical simulation giving the lateral and longitudinal resolutions for the field to be observed, at a working frequency f. The black curves join the points having the same lateral resolution and the white curves join the points having the same longitudinal resolution. By varying the working frequency parameter from a simulation to another, it is possible to select the frequency that offers the best average lateral resolution in the imaged area I. It will be noticed that the longitudinal resolution does not depend on the antenna geometrical characteristics. So, the optimal working frequency is chosen to be 600 kHz, the area to be imaged being located at a range of 80 m. Accordingly, the reached resolution taking into account the constraints of the system is lower than 50 cm.

At the present time, the lateral resolution actually reached by an experimental frontal sonar made up according to the described embodiment is of 40 cm at a range of 80 m, with a working frequency of 400 kHz.

Figure 3:
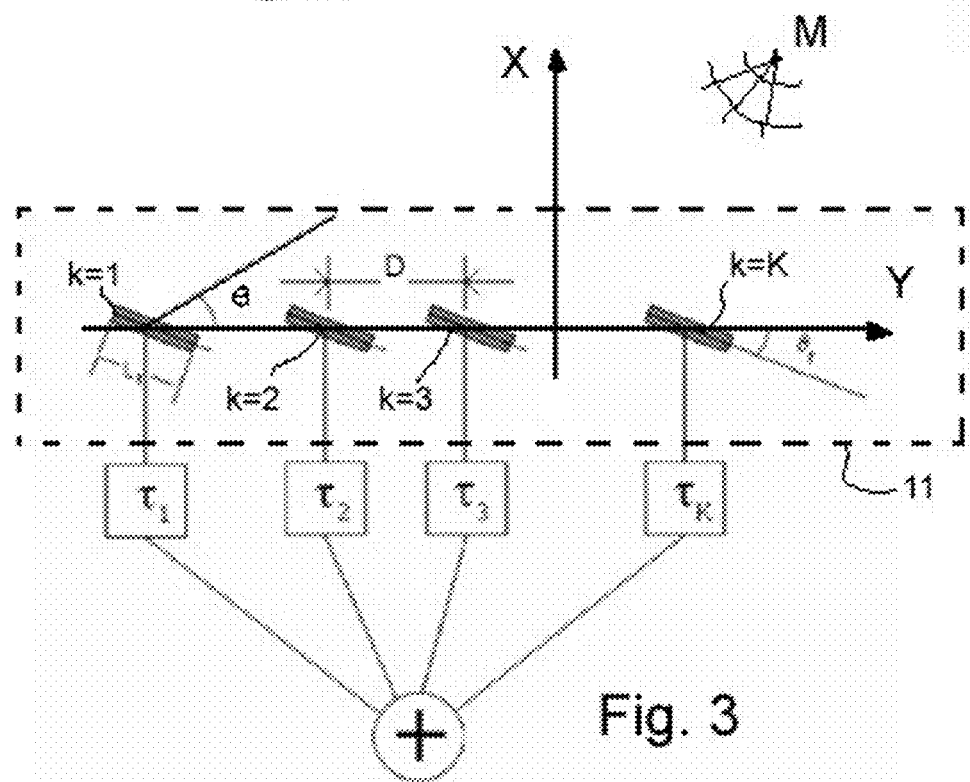

By reference to FIG. 3, antenna 11 of sonar 10 consists in a row of transducers k, k varying between 1 and K=48, operating in reception. The different transducers are arranged in line along lateral direction Y so as to form a periodic array. The receivers are separated with a pitch d in direction Y. To gain in generality, each transducer forms a rectangular parallelepiped of length $L_r$, forming an angle $\theta_r$ relative to direction Y (in the frontal sonar according to the invention, angle $\theta_r$ of the transducers is null: $\theta_r=0$).

This lacunar antenna 11 enables to observe a source M under an angle $\theta$ in the plane XY. It is considered that the wave emitted by source M is a plane incident wave at antenna 11. Acoustic signals respectively received by each of the transducers are thus identical, to within a temporal phase shift. The matter is then, acting on coefficients $\tau_1$ to $\tau_K$, to correct this phase shift to reconstruct the incident plane wave.

It is shown that the ratio of inter-sensor pitch d (d=L/K) to wavelength $\lambda$ of the chosen working frequency is approximately equal to four. This means that antenna 11 is widely under-sampled. This antenna is thus a lacunar antenna having image lobes in reception.

The fact that the pitch d separating two successive transducers k and k+1 is larger than wavelength $\lambda$ entails uncertainty on the phase shift value between these two transducers: the phase shift is known modulo $\pi$. Thus, for a same signal detected by the lacunar antenna, source M may be located at different angular positions of the field observed. There is thus an ambiguity about the value of angle $\theta$ under which an echo coming from source M is "viewed" by lacunar antenna 11.

Figure 4:
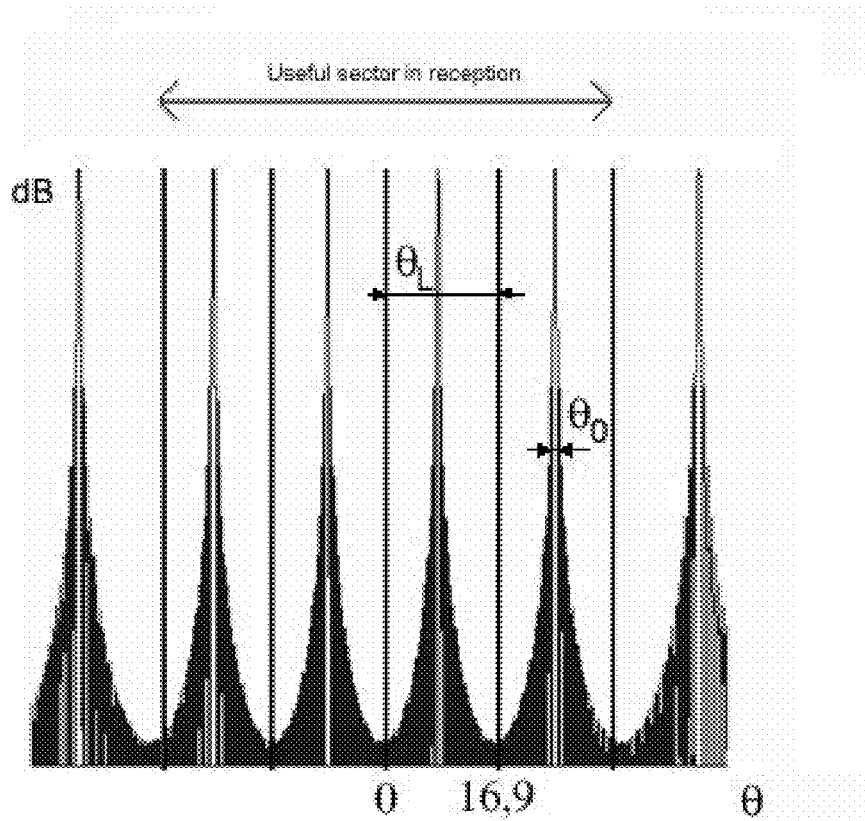
FIG. 4 shows the gain relative to the observation angle in the sight plane of the lacunar antenna of FIG. 3.

Therefore, homogeneously insonifying imaged area I gives the graph of FIG. 4 illustrating the gain of lacunar antenna 11 relative to observation angle $\theta$. A gain periodicity of $\theta_L=16.9°$ is recorded. Each period corresponds to an image lobe of antenna 11. Moreover, the aperture angle $\theta_0$, defined as the gain at −3 dB, of an image lobe is equal to $\lambda/L$, where L=Ni× d, namely 0.4°. For covering the area to be imaged I, located at a distance of R=80 m and having a width W=45 m, only four useful image lobes among the set of image lobes of antenna 11 are to be considered.

According to the invention, instead of uniformly insonifying the whole area to be imaged I, a sectorized insonification is performed. The insonified area E is firstly divided into M sectors $E_1$-$E_M$, and then each sector $E_i$ is associated with a particular useful image lobe. Considering that four image lobes are enough to observe the area to be imaged, it is chosen to divide the insonified area E into four sectors $E_1$-$E_4$ (M=4).

The insonification means according to the invention comprise as many emission channels as there are sectors to be insonified. In this case, the sonar according to the invention comprises four emission channels consisting of a transducer operating in emission and electronics for operating this emitter.

The emitters used are directional, i.e. they emit in an emission cone of angle $\theta_e$ chosen so as to insonify a single sector of the seafloor (the angular aperture of which corresponds to the area to be imaged, divided by the number of emission sectors).

In the presently preferred embodiment, sectors $E_1$-$E_4$ are insonified at the same instant but by sound signals having different characteristic frequencies. As a result, it is known how to associate an echo of a particular frequency with a sector, thus a lobe of the antenna, i.e. at an interval of values of observation angle $\theta$. Ambiguity of antenna 11 is thus removed.

In another embodiment of the invention, the sectors are insonified successively in time by a sound signal of a given frequency. The temporal correlation between the echo receiving instant and the emission instant enables once again to associate the echo with a sector, thus with a particular image lobe, i.e. an interval of values of observation angle $\theta$, and then to remove ambiguity of antenna 11.

Possibly, in still another embodiment variant of the invention, these two types of sectorized emission can be combined: for example, by performing a synchronised insonification at different frequencies in a first sonar operation recurrence, and a not-synchronized insonification at a given frequency in the next recurrence.

Figure 5:
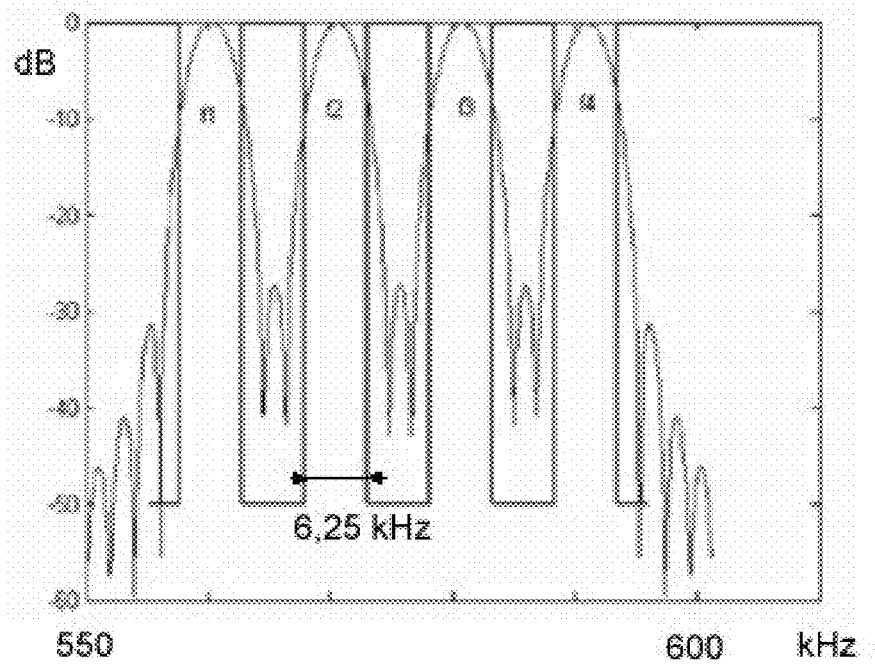
FIG. 5 shows the frequency spectrum of the insonification waves emitted at a given instant by the sectorized emission means of the frontal sonar according to the invention.

FIG. 5 shows a frequency spectrum of the acoustic signals emitted respectively by the four sonar emission channels. This spectrum shows the superposition of four signals respectively centred on average frequencies $f_1$, $f_2$, $f_3$ and $f_4$.

To insonify a sector, a signal is tried to be produced, centred on an average frequency $f_i$ and with a spectral width the closest possible of a 6.25-kHz-wide rectangular function. It will be noticed that the insonification frequencies must be lower than 600 kHz because, beyond this frequency, the propagation effects in the body of water are significant while being close to this upper limit, to obtain high resolution. Moreover, the series of different average frequencies chosen must be within an interval of about 50 kHz corresponding to the detection bandwidth of antenna 11.

According to the example shown in FIG. 5, each signal emitted by an emission transducer is a function called "FP code", weighted by a Hanning function, so that, during the insonification of a sector at an average frequency $f_i$, the signal component of frequency $f_j$ is insignificant. Interferences between image lobe i and image lobe j are thus prevented.

Figure 6A:
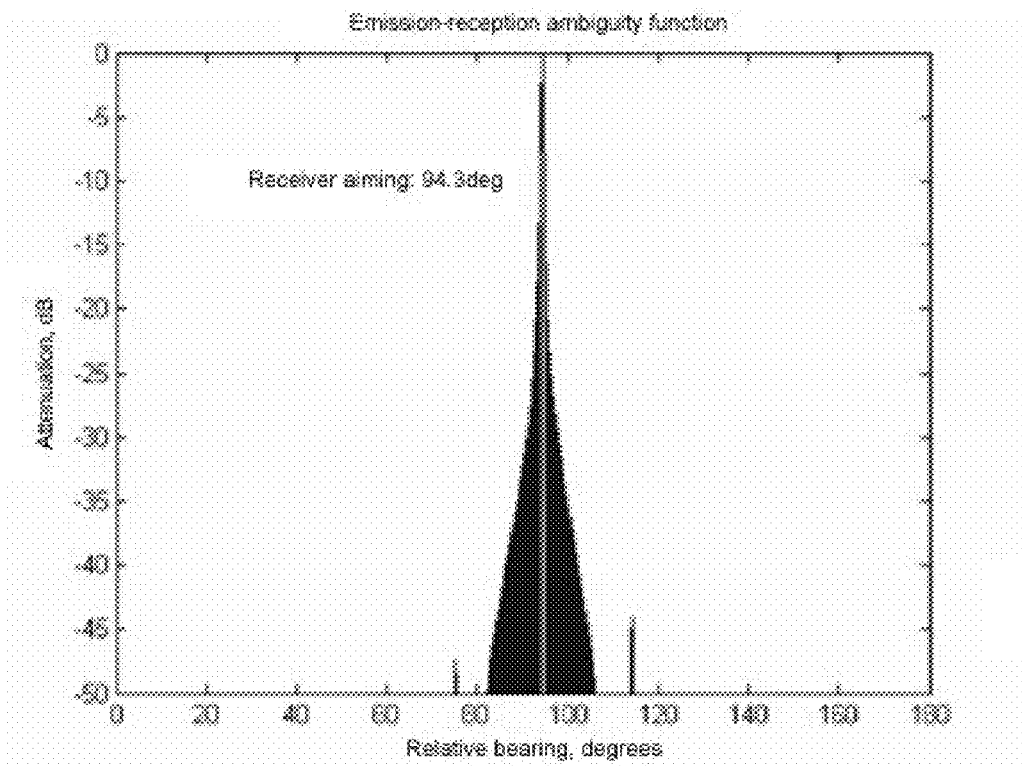
FIG. 6A shows the transfer function between emission and reception when an insonified sector is angularly aligned with an image lobe of the lacunar antenna of FIG. 4.

FIG. 6A shows the ambiguity function when the insonified sector is angularly aligned with the image lobe of the antenna. It is noticed that the residual signals in the neighbouring lobes of the considered lobe have very small amplitude. Ambiguity of the antenna has thus been removed.

Figure 6B:
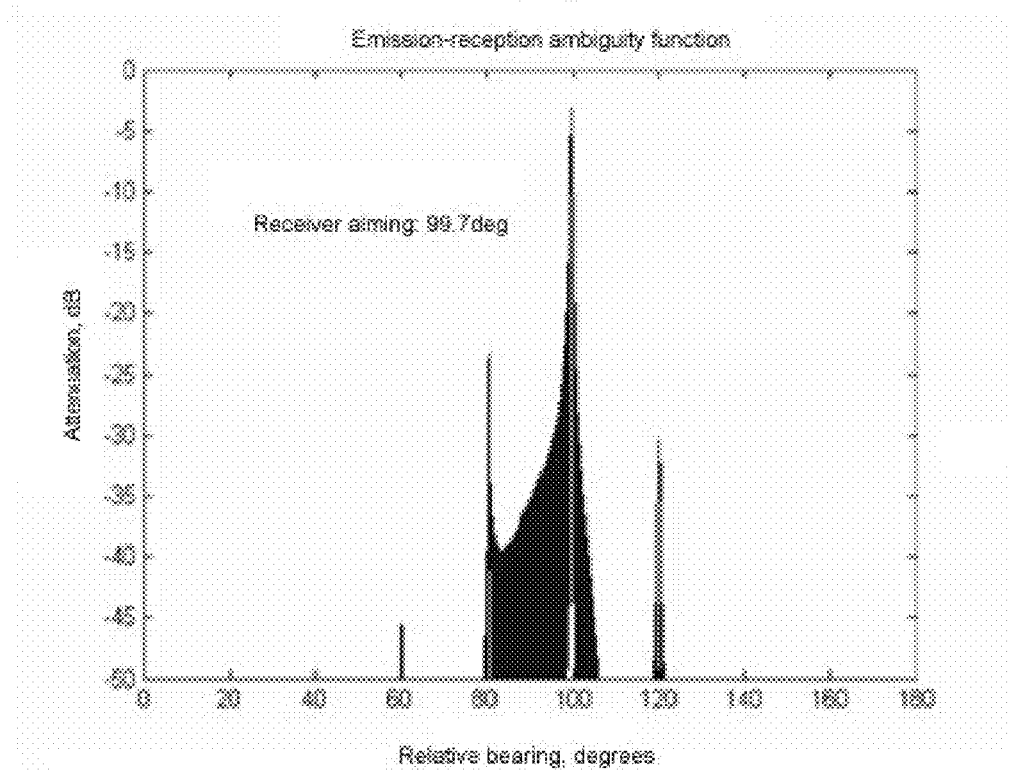
FIG. 6B shows the transfer function when the insonified sector is angularly offset relative to the image lobe of the lacunar antenna.

On the other hand, in FIG. 6B, when there is a slight angular offset between the insonified sector and the image lobe, the residual signals in the neighbouring lobes of the considered lobe are clearly less attenuated and, in case of a significant offset, they may possibly not enable the lacunar antenna ambiguity to be removed.

Study of array-antenna is well documented and reference is made to the course given at the ENSIETA, entitled "traitement d'antenne" ("antenna processing"), by Valérie MAZAURIC, 2003 (ref. 1335 DE/SCO-S3-RE/HY).

Choosing a lacunar antenna entails consequences on the antenna contrast function which is in principle degraded relative to that of the adjacent antenna. Contrast is the ratio of the signal received from a shadow area on the main lobe (namely, the noise alone) to the contribution of the other interfering lobes (secondary lobes in emission, array lobe in reception). Concerning these questions on the notion of contrast, reference will be made to the book "Sonars et acoustique sous-marine", Jean-Paul Marage, edited by Thomson-Sintra.

In other words, the contrast optimization parameter is inter-sensor pitch d because the latter defines the angular spacing between two successive lobes.

The criterion retained to optimize contrast of the sonar according to the invention is an inter-sensor pitch d that enables an emission/reception level at maximal misalignment equal to the amplitude of a conventional secondary lobe in emission.

Figure 7:
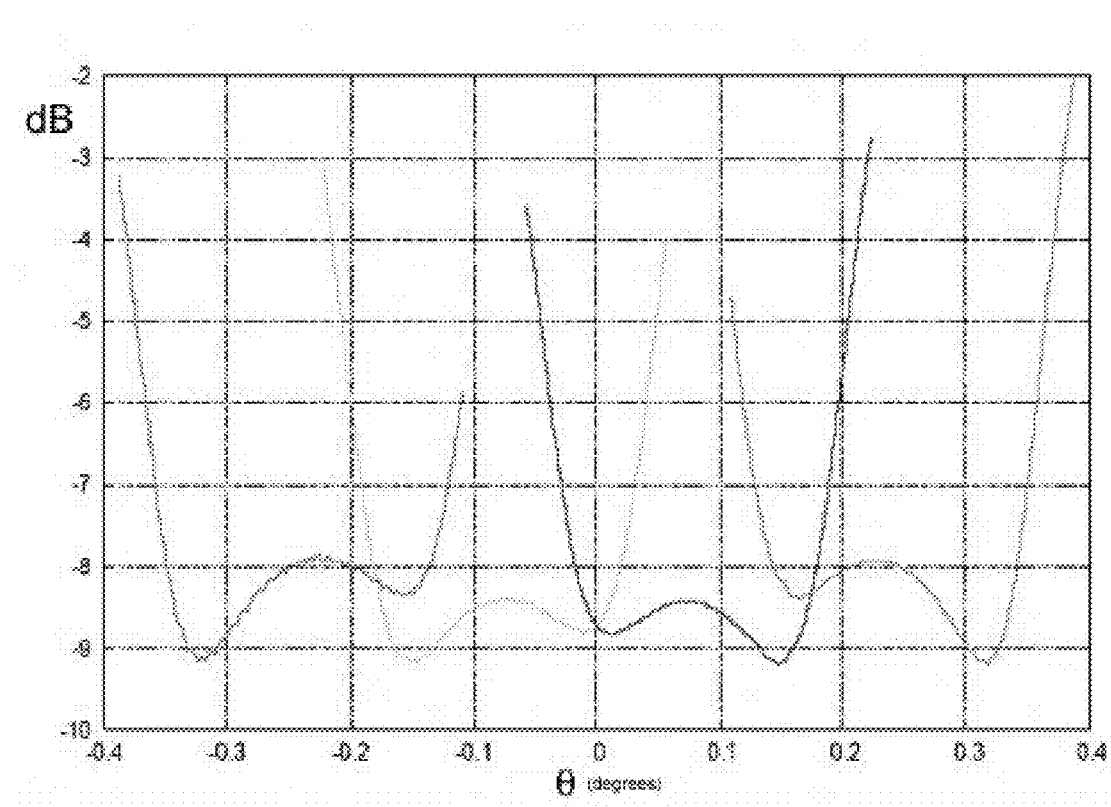
FIG. 7 shows the contrast function of the frontal sonar according to the invention.

FIG. 7 shows the four contrast functions on the four useful lobes.

Though the invention has been described above by reference to a particular embodiment, the invention is not limited to this embodiment and includes all technical equivalents to the described means as well as their combinations that are within the scope of the invention.

In particular, the frontal sonar according to the invention can be used for the antenna synthesis, coherent or not coherent. The matter is to correlate the K transducer signals over a plurality of sonar operation recurrences.

The invention claimed is:

1. A frontal sonar (10) for observing the seafloor (2), comprising:
   means for insonifying a seafloor area divided into M sectors ($E_1$-$E_4$), able to perform a characteristic insonification of each sector of the area during an operation recurrence of said sonar; and
   receiving means comprising a physical antenna (11) consisting of an array of K transducers, said antenna being lacunar and thus ambiguous thereby defining N image lobes,
   and in that each of said characteristically insonified sectors is associated with a single image lobe defined by the antenna, so that said antenna ambiguity is removed.

2. The sonar according to claim 1, wherein said insonification means comprise as many emission channels as there are sectors to be characteristically insonified.

3. The sonar according to claim 2, further comprises four emission channels insonifying four sectors respectively, and in that four useful lobes among the N image lobes of the antenna are associated with the four sectors respectively.

4. The sonar according to claim 3, wherein during an operation recurrence of said sonar, each of the emission channels emits around an average frequency ($f_1$-$f_4$) chosen in a list of average frequencies, each emission channel emitting at a frequency different from that of another emission channel, the average frequency characterising the insonification of a particular sector.

5. The sonar according to claim 3, wherein during an operation recurrence of said sonar, each of said emission channels emits around a common average frequency, each of said emission channels insonifying the sector associated therewith at different instants of said recurrence, the emission instant characterising the insonification of a particular sector.

6. The sonar according to claim 1, further comprises:
   a resolution lower than 50 cm for a range of 80 m.

7. The sonar according to claim 6, wherein the resolution is lower than 40 cm for a range of 80 m.

8. The sonar according to claim 1, wherein said lacunar antenna is 0.7 m long, comprises 48 transducers and operates at a working frequency of 400 kHz.

9. A submerged carrier (1) comprising a frontal sonar, wherein said frontal sonar is a sonar (10) according to claim 1.

10. The carrier according to claim 9, further comprising:
    lateral sonars,
    wherein said frontal sonar enables to obtain a sonar image having a resolution compatible with the resolution of images obtained by said lateral sonars.

11. A method of observing a seafloor strip (W) by means of a sonar, wherein said sonar (10) being provided with a lacunar antenna (11) consisting of an array of K transducers defining N image lobes, said method comprising:
    dividing a seafloor area to be imaged (E) into several sectors ($E_1$-$E_m$);
    geometrically associating a single image lobe with each of said sectors;
    characteristically insonifying each of said sectors using the insonification means of said sonar;
    acquiring the echo of the sound waves emitted by means of said lacunar antenna;
    forming the channels of said antenna while removing ambiguity of said antenna, taking into account said association of an image lobe with a sector and said characteristic insonification of said sector;
    obtaining an image of the seafloor area (I).

12. The method according to claim 11, wherein during said insonification step, each of said sectors ($E_1$-$E_m$) is insonified by means of a sound signal having a characteristic average frequency ($f_1$-$f_4$).

13. The method according to claim 11, wherein during said insonification step, each of said sectors ($E_1$-$E_m$) is insonified by means of a sound signal emitted at a characteristic instant of said recurrence.

14. The method according to claim 11, wherein said channel forming step is performed over K recurrences of the insonification and acquisition steps in order to synthesize an antenna.

15. The method according to claim 12, wherein during said insonification step, each of said sectors ($E_1$-$E_m$) is insonified by means of a sound signal emitted at a characteristic instant of said recurrence.

16. The method according to claim 12, wherein said channel forming step is performed over K recurrences of the insonification and acquisition steps in order to synthesize an antenna.

17. The method according to claim 13, wherein said channel forming step is performed over K recurrences of the insonification and acquisition steps in order to synthesize an antenna.

* * * * *